United States Patent
Aliane

(10) Patent No.: US 10,498,259 B2
(45) Date of Patent: Dec. 3, 2019

(54) METHOD OF PRODUCING A TRIBOELECTRIC GENERATOR WITH ROUGH DIELECTRIC POLYMER

(71) Applicant: Commissariat a L'Energie Atomique et aux Energies Alternatives, Paris (FR)

(72) Inventor: Abdelkader Aliane, Grenoble (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 388 days.

(21) Appl. No.: 14/803,429

(22) Filed: Jul. 20, 2015

(65) Prior Publication Data
US 2016/0028327 A1 Jan. 28, 2016

(30) Foreign Application Priority Data
Jul. 24, 2014 (FR) ...................... 14 57138

(51) Int. Cl.
*H02N 1/00* (2006.01)
*H02N 1/04* (2006.01)
*B05D 3/06* (2006.01)
*B05D 5/02* (2006.01)

(52) U.S. Cl.
CPC ............... *H02N 1/04* (2013.01); *B05D 3/065* (2013.01); *B05D 5/02* (2013.01)

(58) Field of Classification Search
CPC .................... H02N 1/00; B05D 3/00
See application file for complete search history.

(56) References Cited

U.S. PATENT DOCUMENTS

| | | | | |
|---|---|---|---|---|
| 8,519,596 B1* | 8/2013 | Kim | ......................... | H02N 1/04 310/309 |
| 2004/0016912 A1* | 1/2004 | Bandyopadhyay | ...... | C08K 3/04 252/500 |
| 2008/0021328 A1* | 1/2008 | Habu | .................... | B06B 1/0611 600/459 |
| 2009/0285981 A1* | 11/2009 | Dyreklev | ................ | G11C 11/22 427/131 |
| 2013/0049531 A1 | 2/2013 | Wang et al. | | |
| 2014/0084748 A1* | 3/2014 | Wang | ....................... | H02N 1/04 310/300 |
| 2015/0153297 A1 | 6/2015 | Aliane et al. | | |

OTHER PUBLICATIONS

NPL, "Graphene-P(VDF-TrFE) multilayer film for flexible applications", Sang-Hoon Bae, Orhan Kahya, Bhupendra K. Sharma, Junggou Kwon, Hyoung J. Cho, Barbaros Ozyilmaz, and Jong-Hyun Ahn, ACS nano, vol. 7, No. 4, 3130-3138, 2013.*

(Continued)

*Primary Examiner* — Gordon Baldwin
*Assistant Examiner* — Mohammad Mayy
(74) *Attorney, Agent, or Firm* — Oblon, McClelland, Maier & Neustadt, L.L.P.

(57) ABSTRACT

Production of a triboelectric generator element based on a given dielectric polymer material, provided with a rough surface comprising conical micro-tip shaped structures obtained by means of a heat treatment of the polymer material (FIG. 1C).

17 Claims, 3 Drawing Sheets

(56) References Cited

OTHER PUBLICATIONS

NPL, "XPS and SEM Study of UV Laser Surface Modification of Polymers", Yvan Novis, Rita De Meulemeester, Mohammed Chtai, Jean-Jacques Pireau, Roland Caudano, Brifish Polymer Journal 21 (1989) 147-153.*

"Annealing effect upon chain orientation, crystalline morphology, and polarizability of ultra-thin P(VDF-TrFE) film for nonvolatile polymer memory device", Jong Soon Lee, Arun Anand Prabu, Kap Jin Kim, Polymer 51, (2010) 6319-6333.*

French Preliminary Search Report dated Mar. 13, 2015 in French Application 14 57138, filed on Jul. 24, 2014 (with English Translation of Categories of Cited Documents).

Feng-Ru Fan et al. "Transparent Triboelectric Nanogenerators and Self-Powered Pressure Sensors Based on Micropatterned Plastic Films", Nano Letters, vol. 12, 2012, 6 pages.

* cited by examiner

METHOD OF PRODUCING A TRIBOELECTRIC GENERATOR WITH ROUGH DIELECTRIC POLYMER

TECHNICAL FIELD AND PRIOR ART

The present invention relates to the field of triboelectric effect generators and the fabrication thereof.

It relates in particular to the production a triboelectric generator provided with at least one element comprising a layer of dielectric polymer material with a rough surface, without necessarily having to use a mould to create or to modify the roughness of the surface of this layer of dielectric material.

The operation of a triboelectric generator is based on a placing in contact of a first material and a second material of different natures, a first material having a tendency to donate electrons, the second material preferably having a tendency to capture electrons. By placing in contact materials having different triboelectric properties a transfer of charges is created between these two materials which may be reflected in the form of a difference in potentials or a current. The triboelectric effect may be increased by rubbing the materials against each other.

To manufacture a triboelectric generator, it is known to use a layer of polymer material that is structured to create on the surface thereof a considerable roughness and thus to be able to increase the phenomenon of friction.

The documents US 2013/0049531 A1 and "Transparent Triboelectric Nano-generators and Self-Powered Pressure Sensors Based on Micropatterned Plastic Films", Feng-Ru Fan et al., Nano Letters 2012, 12, 3109-3114 describe a method of producing a triboelectric effect generator including a layer of polydimethylsiloxane (PDMS) with rough surface, the roughness of which is formed by creation of patterns in the form of grooves, or instead cubes, or instead pyramids, by means of a mould.

Such a method requires a filling of the mould by PDMS, and above all an arduous step of removing the structured PDMS from the mould without damaging it. The removal of the PDMS may moreover have the drawback of requiring the use of a surfactant.

The problem is posed of finding a novel method of producing a triboelectric effect generator provided with at least one layer of rough polymer material and which does not require the use of a mould.

DESCRIPTION OF THE INVENTION

According to an embodiment, the present invention firstly relates to a method of producing an element of a triboelectric effect generator including the steps consisting in:

a) forming on a support a layer based on a material based on a given dielectric polymer, b) carrying out at least one heat treatment on the given dielectric polymer material so as to crystallise the given dielectric polymer material and generate micro-tip, in particular conical, shaped structures at the surface of the given dielectric polymer material.

The given dielectric polymer material may be chosen so as to have a high dielectric constant, preferably such that $\varepsilon_r > 30$ ($\varepsilon_r$ being the relative permittivity of the dielectric material).

The given dielectric polymer material is advantageously a hydrophobic material.

The given dielectric polymer material may thus be provided with a fluorinated group, for example a polyvinylidene fluoride (PVDF) group.

Advantageously, the given dielectric polymer material may be a terpolymer such as P(VDF-TrFe-CFE) or P(VDF-TrFe-CTFE) or a mixture of P(VDF-TrFe-CFE) and P(VDF-TrFe-CTFE). Other polymers based on PVDF such as P(VDF-TrFe) copolymers may be used.

The polymer material formed at step a) may be in the form of a polymer matrix comprising an additive, chosen so as to have a rate of transition greater than that of the given dielectric polymer.

"Transition" is taken to mean a structural modification under the effect of the variation of an external parameter, here the temperature.

The additive may be chosen so as to have a temperature of change of its structuring less than that of the given polymer and such that when the crystallisation heat treatment is carried out, a structural modification (crystallisation) of the polymer matrix leads to a stressing of this additive.

This mechanical stress brings out structures in the form of micro-tips in particular of conical shape.

The heat treatment step b) may be a photonic annealing including an exposure of the layer of polymer material to at least one UV radiation light pulse, also known as UV flash. Such a treatment particularly has the advantage of being rapid to carry out and to make it possible to modify the dielectric polymer material mainly at the surface.

The additive used in step a) may then be advantageously a UV radiation absorbing compound such as pyrene.

Such an additive may make it possible to favour the development of a rough surface on the dielectric polymer material during step b).

According to an implementation possibility, the support may be a flexible support based on polymer material.

An embodiment of the present invention provides for a method of manufacturing a triboelectric effect generator including a first element intended to be placed in contact with a second element in order to create electrical charges, the method including the steps consisting in:

carrying out a method as defined previously to form the first element, forming a layer based on graphene on a second support to produce the second element.

Graphene has the advantage of being a rough conducting material favourable to generating friction and in which the electrical conductivity increases with temperature, it being capable of increasing when the friction increases.

The invention relates to, according to another aspect, a triboelectric generator implemented by means of a method as defined previously.

The invention also relates to a triboelectric generator for creating electrical charges by placing in contact a first element and a second element, the first element including a conducting layer coated with a rough dielectric polymer material comprising conically shaped micro-tips.

The given dielectric polymer material may be a dielectric material with high dielectric constant, in particular such that $\varepsilon_r > 30$ ($\varepsilon_r$ being the relative permittivity of the dielectric material).

A dielectric material with high dielectric constant makes it possible to generate a stronger triboelectric current, in particular in the case where the friction (generation of temperature at the interfaces) makes its dielectric constant increase.

The given dielectric polymer material may advantageously be a hydrophobic material.

By providing a hydrophobic polymer material, the humidity is reduced at the level of the rough surface of said material entering into contact with another element to generate electrical charges. This thus avoids reducing friction at the level of the rough contact surface which makes it possible to have better electrical energy production.

The given dielectric polymer material may include a terpolymer, in particular based on PVDF such as P(VDF-TrFe-CFE) or P(VDF-TrFe-CTFE) or a mixture of P(VDF-TrFe-CFE) and P(VDF-TrFe-CTFE). A copolymer based on PVDF such as P(VDF-TrFe) may also be used.

The second element may advantageously be coated with graphene.

An embodiment of the invention also provides for a humidity sensor including a triboelectric generator as defined above.

BRIEF DESCRIPTION OF THE DRAWINGS

The present invention will be better understood on reading the description of examples of embodiment given purely for illustrative purposes and in no way limiting, while referring to the appended drawings in which.

Identical, similar or equivalent parts of the different figures bear the same numerical references so as to make it easier to go from one figure to the next.

The different parts represented in the figures are not necessarily shown according to a uniform scale, in order to make the figures more legible.

DETAILED DESCRIPTION OF PARTICULAR EMBODIMENTS

Figure 1A:
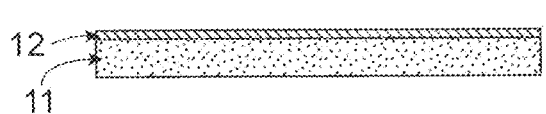
FIGS. 1A-1C illustrate an example of a method according to an embodiment of the invention to implement an element of a triboelectric generator, said element including a dielectric polymer material on which a rough surface is created in the form of conical micro-tips while modifying by heat treatment the structure of the dielectric material of the polymer.
Figure 1B:
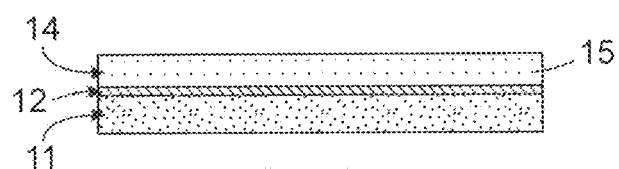

An example of the method of producing a triboelectric generator element will now be given in conjunction with FIGS. 1A-1C.

The starting material of this method may be a support 11, the composition and the thickness of which are provided so as to make it flexible.

The support 11 may be formed of a layer of polymer material, for example such as polyethylene naphthalate (PEN) or polyethylene terephthalate (PET), or polyimide (PI), or poly-ether-ether-ketone (PEEK), or a cellulose paper substrate and have a thickness which may for example be comprised between 5 µm and 200 µm, for example of the order of 25 µm.

On the support 11, a conducting layer 12 (FIG. 1A) is firstly deposited, intended to form a first electrode. The conducting layer may be formed for example by physical vapour deposition (PVD) or by ink jet, or by serigraphy, or by ultrasonic spray coating.

The conducting layer 12 may for example be based on a metal material such as silver (Ag), platinum (Pt), aluminium (Al), copper (Cu), gold (Au), titanium (Ti), Indium Tin Oxide (ITO), or nano-wires, for example based on silver, and may have a thickness comprised for example between 10 nm and 1 µm. According to a particular embodiment example, the metal layer 12 is a layer based on gold of 30 nm thickness.

Then, a layer 14 based on a dielectric polymer material 15 (FIG. 1B) is formed on the metal layer 12. The layer of dielectric polymer material 15 has a thickness which may be comprised for example between 100 nm and 20 µm. The dielectric polymer material 15 is chosen preferably so as to have a high dielectric constant, in particular such that $\varepsilon_r > 30$, and preferably capable of varying as a function of the temperature at which this material is placed. The dielectric polymer material 15 may also be chosen so as to have hydrophobic properties. To meet these criteria, the dielectric polymer material 15 chosen may for example be based on a terpolymer including a fluorinated group, in particular based on polyvinylidene fluoride (PVDF).

According to particular embodiment examples, the dielectric polymer material 15 may be P(VDF-TrFe-CFE), or P(VDF-TrFe-CTFE), or a compound based on P(VDF-TrFe-CFE) and P(VDF-TrFe-CTFE). According to another example, the dielectric polymer material 15 may be a copolymer based on PVDF such as for example P(VDF-TrFe).

Prior to its deposition, the dielectric polymer material 15 may be prepared in the form of a mixture of a first solution based on a terpolymer such as P(VDF-TrFe), or P(VDF-TrFe-CTFE), or P(VDF-TrFe-CFE), or mixed P(VDF-TrFe) and P(VDF-TrFe-CTFE), and of a second solution including an additive having a transition temperature, in particular crystallisation temperature, less than that of the given polymer. The additive chosen may for example be pyrene ($C_{16}H_{10}$).

The first solution may be produced by introduction of a powder based on P(VDF-TrFe-CFE) and/or P(VDF-TrFe-CTFE) which is dissolved in a solvent such as for example cyclopentanone, dimethylformamide or dimethylacetamide.

The proportion of terpolymer in its solvent may vary by weight for example from 1% to 20%.

The second solution may be produced by introduction of solid grains of pyrene which are dissolved in a solvent such as for example acetone so as to have a proportion by weight of pyrene which may for example be comprised between 5% and 40%.

The proportion of terpolymer in the mixture particularly conditions the viscosity of the deposition solution, it being able to be adapted as a function of the type of deposition technique that it is wished to use. For example, when it is wished to carry out a deposition by serigraphy, it is possible to implement a solution having a considerable viscosity, doing so by providing for a high concentration of terpolymer in its solvent. According to another example, when it is wished to carry out a deposition by spin coating, a solution of lower viscosity and thus having a lower terpolymer concentration is implemented.

The deposition solution may be composed, in the end, of from 3% to 40% by weight of the second solution in the first solution. The final mixture is stirred at a temperature which may be comprised for example between 30° C. and 45° C.

The deposition of the solution of terpolymer is then followed by at least one step of thermal annealing called "crystallisation annealing", in order to modify the structure of the polymer material and increase the roughness of its surface. A thermal annealing or a succession of annealings at a temperature greater than the crystallisation temperature of the polymer material may be carried out.

For example it is possible to carry out a first annealing at a temperature which may be comprised for example between 90 and 100° C. and according to a duration which may be comprised for example between 5 and 30 min. A particular example of implementation provides for carrying out the first thermal annealing at a temperature of the order of 100° C. for a duration of 5 minutes.

Then, a second annealing is carried out at a temperature which may be comprised for example between 110 and 130° C. and according to a duration for example comprised between 5 and 30 min. This second annealing may make it possible to improve the crystallisation of the polymer. A particular example of implementation provides for carrying out the second thermal annealing at a temperature of the order of 115° C. for a duration of 30 minutes.

During the annealing or annealings, due to the faster crystallisation rate of the matrix of polymers, the structure of the chosen additive, for example chosen from pyrene, polystyrene and a mixture of polystyrene and pyrene, is modified structurally on the surface due to the mechanical stresses exerted by the crystallisation of the dielectric polymer material.

The inventors have noted that, in a surprising manner, this stressing results in the appearance of conical microstructures or micro-tips 17, that is to say cone of revolution shaped. The heat treatment of the polymer material thus makes it possible to favour the formation of a considerable roughness on the layer 12 (FIG. 1C).

The appearance of conical micro-tips is particularly conditioned by the choice in terms of respective rates of crystallisation and the appearance of mechanical stresses on the surface of the terpolymer and the additive, and the thermal annealing conditions (time, temperature). A suitable crystallisation rate of the terpolymer or the copolymer makes it possible to mechanically stress the additive at the level of the surface and creates microstructure in the form of tips or points.

The size of the micro-tips 17 or micro-points is for its part particularly conditioned by the proportion of terpolymer material in the deposition solution.

Figure 1C:
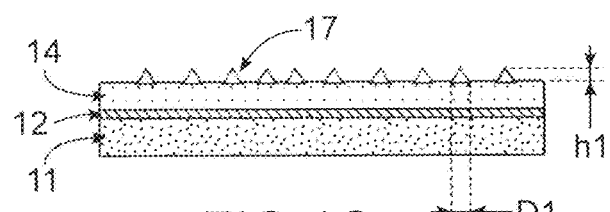

The micro-tips 17 obtained may have a base of diameter $D_1$ (measured in a direction parallel to the plane [0;x;y] of the orthogonal mark [0;x;y;z] in FIG. 1C) comprised for example between 2 μm and 10 μm, of the order of several micrometres and a height $H_1$ (measured in a direction orthogonal to the plane [0;x;y] in FIG. 1C) comprised for example between 200 nm and 5 μm.

By replacing the thermal annealing, it is possible to carry out a photonic annealing to crystallise the polymer material 15 and make micro-tips 17 appear on its surface.

The photonic annealing may include a very brief exposure, i.e. comprised between several μs and several ms, to a UV radiation. A UV pulse, also known as UV flash for a duration for example comprised between 1 ms and 2 ms, and according to a fluence comprised for example between 15 J/cm² and 50 J/cm² may be implemented to carry out this photonic annealing.

A particular example provides for the exposure to pulsed UV radiation with a pulse duration (also known as "pulse") of 2 ms and a fluence of 17 J/cm² when the layer of polymer material has a thickness of the order of 2 μm.

Figure 3:
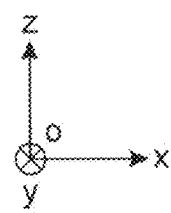
FIG. 3 illustrates a rough surface provided with conical micro-tips on a dielectric polymer material as implemented in a triboelectric generator according to the invention.
Figure 3:
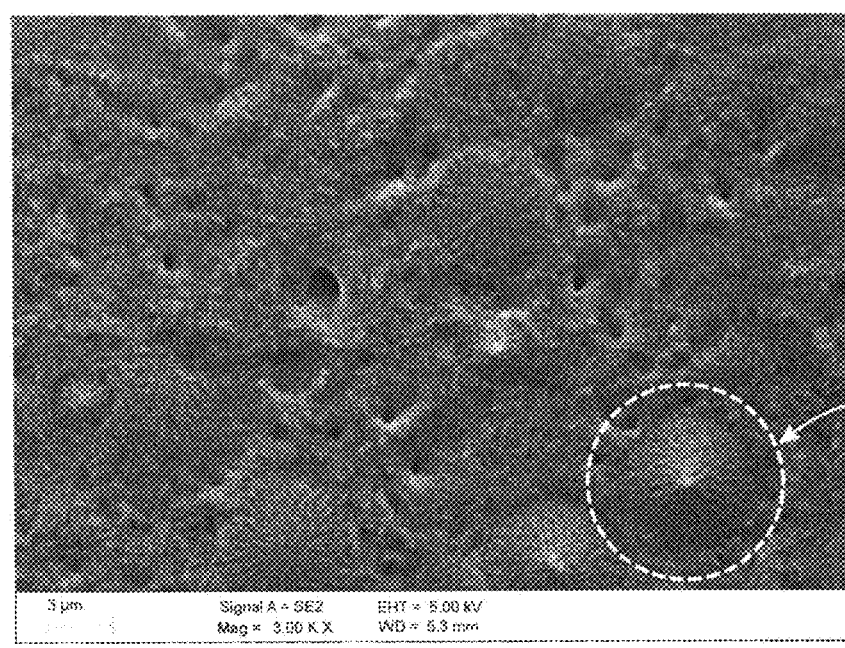

FIG. 3 gives an image obtained by scanning electron microscope of the upper face of a polymer layer formed from a mixture of PVDF and pyrene after a heat treatment as described previously and leading to the formation of conical micro-tips 17.

In order to be able to generate electrostatic charges, the layer 14 of dielectric polymer material 15 with rough surface and coated with micro-tips 17 is intended to be placed in contact with another element provided with an electrode.

Figure 2:
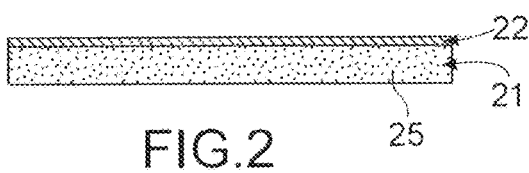
FIG. 2 illustrates an embodiment of another triboelectric generator element intended to be placed in contact with an element as illustrated for example in FIGS. 1A-1C.

An example of embodiment of this other element is given in FIG. 2 and includes a second support 21 intended to be placed in contact with the layer of dielectric polymer material 15 with rough surface. The second support 21 is formed based on a given material having triboelectric characteristics different to those of the dielectric polymer material 15 resting on the first support 11.

The second support 21 may for example be based on a dielectric material 25, which may be a polymer and similar to the material of the first support 11.

The dielectric material 25 of the second support 21 may thus for example be polyethylene naphthalate (PEN) or polyethylene terephthalate (PET), or a polyimide (PI), or poly-ether-ether-ketone (PEEK), or a cellulose paper and have a thickness which may for example be comprised between 5 μm and 200 μm, for example of the order of 25 μm. Thus, the second support 21 may also have a composition and a thickness provided so as to make it flexible.

On the second support 21, a conducting layer 22, which may be metal, forms a second electrode. The conducting layer 22 may advantageously be produced at the same time as that formed on the first support 11.

Figure 4:
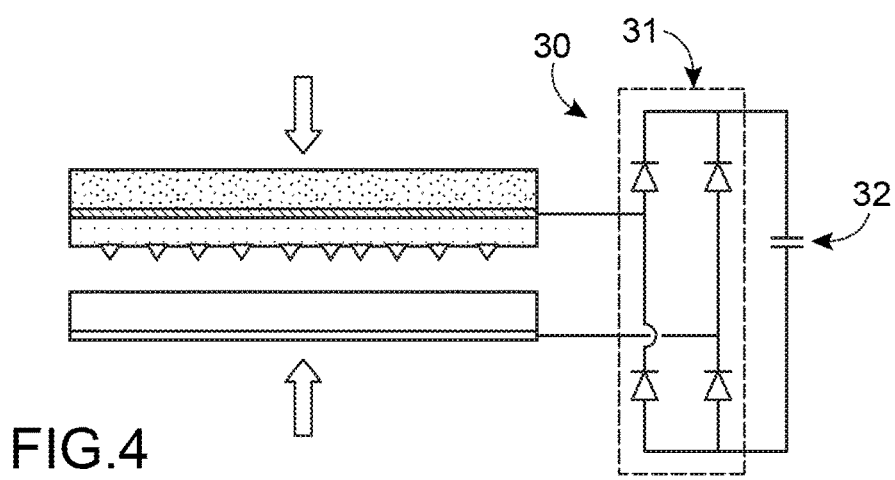
FIG. 4 illustrates an example of device according to the invention including a triboelectric generator associated with a circuit for recovering and storing electrical energy produced by the generator.

FIG. 4 illustrates the triboelectric generator produced previously associated with an electrical energy recovery circuit.

An actuation of the triboelectric generator may be carried out by exerting a pressure on the first support 11 and/or on the second support 21, so as to place in contact the rough surface of the layer 14 of dielectric polymer material 15 provided with conical micro-tips 17 with the dielectric material 25 of the support 21.

The roughness of the dielectric polymer material 15 by means of conical shaped micro-tips makes it possible to obtain a good coefficient of friction with the dielectric material 25. At the moment of friction between the materials 15 and 25 having different triboelectric properties, and in particular different aptitudes to donate or accept electrons, a local heating due to friction makes vary the dielectric constant and thus the electrical capacitance of the system and consequently the electrical signal generated by triboelectric effect by the generator.

The electrical energy recovery circuit is connected to the charge collecting conducting layers 12, 22 and may include a rectifier means 31 to rectify an electrical signal produced by the generator, as well as an electrical charge storage means 32, for example in the form of a capacitance at the output of the rectifier means 31 making it possible to accumulate the electrical energy produced by the generator. The rectifier 31 is for example formed of a bridge of 4 diodes.

Figure 5A:
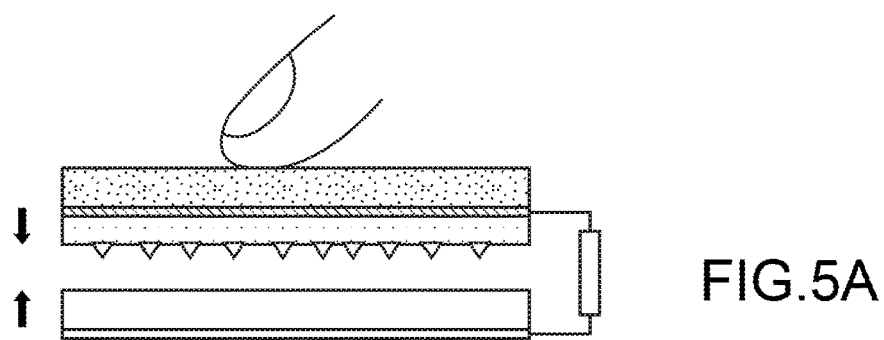
FIGS. 5A-5C illustrate an electrical test of a triboelectric generator.
Figure 5B:
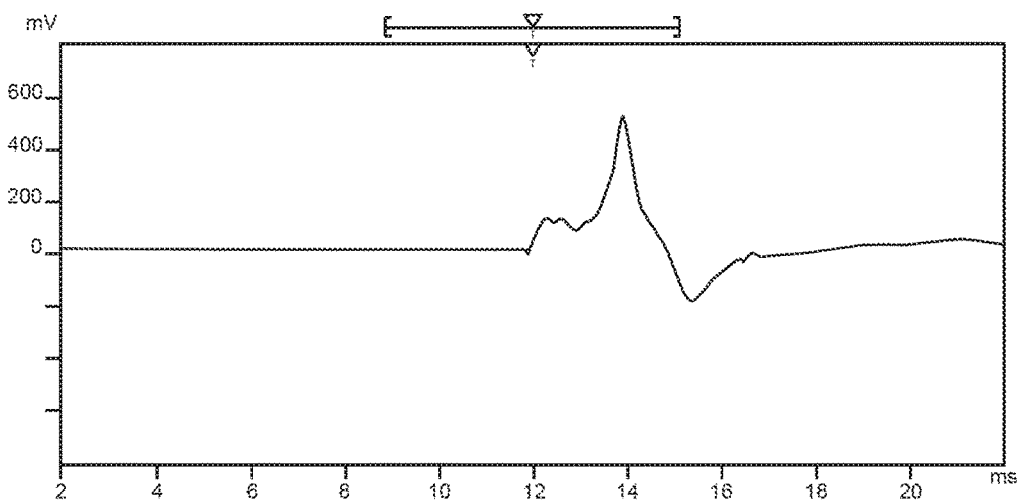
Figure 5C:
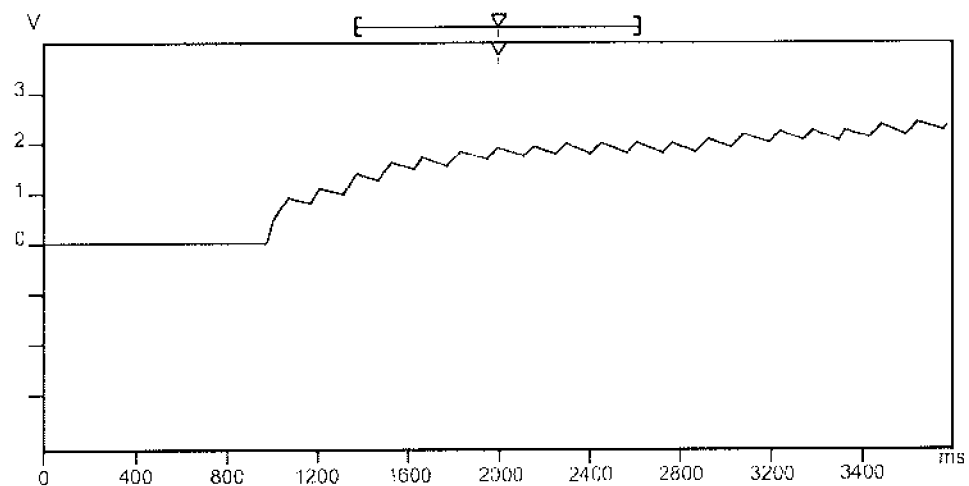

FIGS. 5A-5C illustrate a test of the triboelectric generator described previously during which the dielectric polymer layer 15 and the dielectric material 25 of the support 21 are placed in contact by applying a finger on the first support 11 (FIG. 5A). The placing in contact is such that the contact surface between the materials 15 and 25 may for example be of the order of 2.5 cm*2.5 cm. The pressure exerted on the first support 11 is then released and an electrical signal (FIG. 5B) generated by triboelectric effect at the output of the generator is visualised for example using an oscilloscope having an input impedance for example of the order of 1 MΩ.

FIG. 5C gives an example of electrical signal generated at the terminals of the capacitance 32 at the output of the rectifier bridge 31. By virtue of the conical shape of the tips of the triboelectric generator, it is possible to obtain a triboelectric signal of considerable amplitude.

According to a variant of implementation of the triboelectric generator, the porous dielectric material 15 comprising conical micro-structures 17, may be placed in contact directly with an electrode to generate electrostatic charges.

Figure 6:
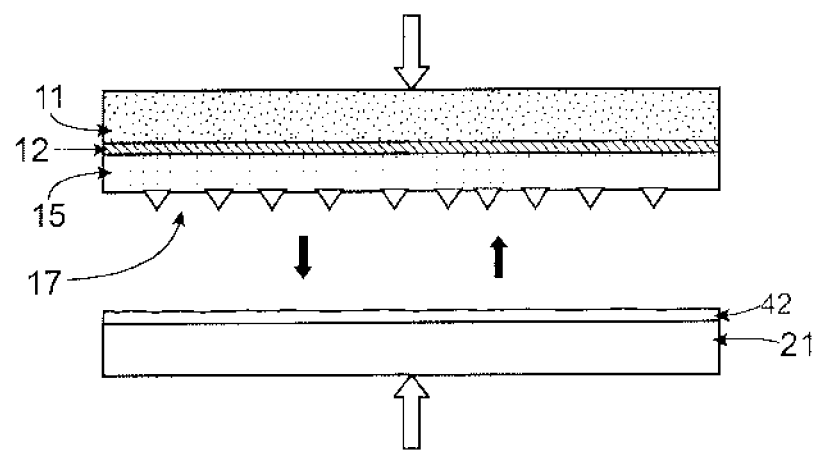
FIG. 6 illustrates a variant of a triboelectric generator provided with a layer of graphene intended to be placed in contact with a rough dielectric polymer material in order to improve the generation of electrical charges.

FIG. 6 illustrates an example of particular embodiment of such a variant in which the rough porous dielectric material 15 is intended to be placed in contact with a conducting layer serving as electrode and formed of a rough conducting material 42. This rough conducting material 42 is a material in which the electrical resistivity decreases when the temperature increases such as for example graphene.

When the generator is actuated so as to place in friction the rough conducting layer 42 based on graphene and the rough porous dielectric material 15 having different triboelectric properties to those of graphene, the electrical conductivity of the graphene is increased, which makes it possible to increase the electrical signal generated by triboelectric effect.

A particular application of a triboelectric generator according to one or the other of the examples described previously relates to the measurement of humidity. It is thus possible to integrate the triboelectric effect generator in a humidity sensor.

The humidity within the sensor is capable of making the friction vary between the layer 14 of rough dielectric polymer material 15 with conical micro-tips and another layer having different triboelectric properties.

Thus, depending on the humidity of the medium in which is located the sensor it is possible to obtain at the outlet of the generator, for a same actuating force making it possible to cause a placing in contact of its elements, different levels of signals at the outlet of the triboelectric effect generator.

The invention claimed is:

1. A method of producing a triboelectric generator first element, the method comprising:
   a) depositing a conducting layer on a support,
   b) forming on the conducting layer a dielectric polymer material layer with an exposed surface, and
   c) roughening the exposed surface of the dielectric polymer material layer by carrying out a crystallisation annealing so as to crystallise the dielectric polymer material and to form micro-tip shaped structures on the exposed surface of the dielectric polymer material layer, thereby obtaining the first element with a roughened exposed surface,
   wherein the conducting layer is a metal layer, an indium tin oxide layer, or a layer of nano-wires.

2. The method according to claim 1, wherein the dielectric polymer material includes a terpolymer or a copolymer of a polyvinylidene fluoride.

3. The method according to claim 1, wherein the dielectric polymer material is hydrophobic.

4. The method according to claim 2, wherein the dielectric polymer material is a terpolymer of P(VDF-TrFe-CFE) and/or P(VDF-TrFe-CTFE) or a copolymer of P(VDF-TrFe).

5. The method according to claim 1, wherein during b), the dielectric polymer material is mixed with an additive such that the crystallisation of the dielectric polymer material in c) causes mechanical stresses exerted on both the dielectric polymer material and the additive and forms the micro-tip shaped structures on the exposed surface of the dielectric polymer material layer.

6. The method according to claim 5, wherein the additive is a UV radiation absorbing compound.

7. The method according to claim 1, wherein the crystallisation annealing comprises a photonic annealing by exposing the dielectric polymer material layer to at least one UV radiation light pulse.

8. The method according to claim 1, wherein the support is a support of a flexible polymer material.

9. A method of manufacturing a triboelectric effect generator including a first element and a second element, the method comprising:
   forming the first element by the method according to claim 1, and
   forming the second element by forming a graphene layer on a second support of a material having triboelectric properties different from the dielectric polymer material so as to create electrical charges between the first element and the second element by contacting the roughened surface of the first element with the graphene layer of the second element.

10. A method of manufacturing a triboelectric effect generator including a first element and a second element, the method comprising:
    forming the first element by the method according to claim 1, and
    forming the second element comprising a second support of a dielectric material having triboelectric properties different from the dielectric polymer material so as to create electrical charges between the first element and the second element by contacting the roughened surface of the first element with the dielectric material of the second element.

11. The method according to claim 1, wherein the crystallisation annealing comprises at least one thermal annealing.

12. The method according to claim 11, wherein the crystallisation annealing comprises a first annealing at a temperature of 90 to 100° C. for 5 to 30 minutes, followed by a second annealing at a temperature of 110 to 130° C. for 5 to 30 minutes.

13. The method according to claim 5, wherein
    the crystallisation annealing comprises a photonic annealing by exposing the dielectric polymer material layer to at least one UV radiation light pulse, and
    the additive is a UV radiation absorbing compound.

14. The method according to claim 13, wherein the UV radiation absorbing compound is pyrene.

15. The method according to claim 6, wherein the UV radiation absorbing compound is pyrene.

16. A method of manufacturing a triboelectric effect generator including a first element and a second element, the method comprising:
- i) producing the first element by
  - a) depositing a conducting layer on a support,
  - b) forming on the conducting layer a dielectric polymer material layer with an exposed surface, and
  - c) roughening the exposed surface of the dielectric polymer material layer by carrying out a crystallisation annealing so as to crystallise the dielectric polymer material and to form micro-tip shaped structures on the exposed surface of the dielectric polymer material layer, thereby obtaining the first element with a roughened exposed surface;
- ii) producing the second element comprising a second support of a dielectric material having triboelectric properties different from the dielectric polymer material; and
- iii) contacting the roughened surface of the first element with the dielectric material of the second element so as to create electrical charges between the first element and the second element.

17. The method according to claim 16, wherein the dielectric material is a polymer material.

* * * * *